United States Patent
Iwata et al.

(10) Patent No.: US 8,053,054 B2
(45) Date of Patent: Nov. 8, 2011

(54) HONEYCOMB STRUCTURE

(75) Inventors: Koichi Iwata, Kani (JP); Naoshi Masukawa, Kitanagoya (JP); Atsushi Watanabe, Nagoya (JP); Shuichi Ichikawa, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 347 days.

(21) Appl. No.: 12/233,321

(22) Filed: Sep. 18, 2008

(65) Prior Publication Data

US 2009/0029104 A1    Jan. 29, 2009

Related U.S. Application Data

(63) Continuation of application No. PCT/JP2007/056107, filed on Mar. 23, 2007.

(30) Foreign Application Priority Data

Mar. 23, 2006  (JP) .................................. 2006-081795

(51) Int. Cl.
*B32B 3/12* (2006.01)
*B01D 39/06* (2006.01)
(52) U.S. Cl. ............................. 428/116; 55/523; 55/524
(58) Field of Classification Search ........................ None
See application file for complete search history.

(56) References Cited

U.S. PATENT DOCUMENTS

| | | | |
|---|---|---|---|
| 5,914,187 A | 6/1999 | Naruse et al. | |
| 2007/0082174 A1 | 4/2007 | Masukawa et al. | |

FOREIGN PATENT DOCUMENTS

| | | |
|---|---|---|
| EP | 1 860 082 A1 | 11/2007 |
| EP | 1 974 789 A1 | 10/2008 |
| JP | B2-3121497 | 12/2000 |
| WO | WO 2005/089901 A1 | 9/2005 |
| WO | WO 2006/098191 A1 | 9/2006 |

*Primary Examiner* — Gordon R Baldwin
(74) *Attorney, Agent, or Firm* — Oliff & Berridge, PLC

(57) ABSTRACT

A honeycomb structure 1 comprising a honeycomb segment bonded body 10 having a number of honeycomb segments 2 integrated on each bonding planes via bonding material layers 9 has a structure so that a number of cells 5 providing fluid flow channels are disposed in parallel in the direction of center axis thereof. The honeycomb structure 1 is constructed so that the porosity of an outer portion of the bonding material layers 9 (an area from the interface with the honeycomb segment-bonding plane to a point apart from that interface by a distance equivalent to 20% of the entire layer thickness) is smaller than the porosity of a central portion located inward of the outer portion, and so that the bonding material layers 9 have a compression Young's modulus along the Z-axis of 5 to 100 MPa.

15 Claims, 3 Drawing Sheets

HONEYCOMB STRUCTURE

TECHNICAL FIELD

The present invention relates to a honeycomb structure comprising multiple honeycomb segments integrally joined by bonding material layers. More particularly, the present invention relates to a honeycomb structure useful as an exhaust gas filter, particularly a diesel particulate filter (DPF) for collecting particulate matter and the like in the exhaust gas from diesel engines. The honeycomb structure excels in thermal shock resistance and can inhibit cracks and the like without fail, particularly during filter regeneration.

BACKGROUND ART

A honeycomb structure is incorporated in an exhaust gas system of diesel engines as a diesel particulate filter (DPF) to remove particulates (particulate matter) contained in exhaust gas discharged from a diesel engine and the like.

Such a honeycomb structure has a number of cells partitioned by porous partition walls made of silicon carbide (SiC) or the like. The cells serve as fluid channels and are disposed in parallel in the direction of the center axis of the honeycomb structure. The ends of the cells are alternately sealed so that the end of the honeycomb structure exhibits a checkered pattern. Specifically, a certain cell is open at one end (first end) and is plugged at the other end, while another cell adjoining that cell is plugged at the first end and is open at the other end.

According to this structure, exhaust gas introduced into a specific cell (inlet cell) from the first end can be caused to pass through the porous partitions and flowed out from the other cells (outlet cells) adjacent to the inlet cell. It is possible to clean the exhaust gas by entrapping particulate matter in the exhaust gas by the partition walls when the exhaust gas passes therethrough.

In order to continuously use such a honeycomb structure (filter) for a long time, the filter must be regenerated. That is, in order to remove a pressure loss increase due to the particulate matter accumulating on the filter, it is necessary to remove the accumulated particulate matter by burning. During regeneration of the filter, the honeycomb structure undergoes a large thermal stress which may produce defects in the honeycomb structure such as a crack, destruction, and the like. Responding to the demand for increasing shock resistance to such a thermal stress, a divided-type honeycomb structure provided with a function of distributing or reducing thermal stress by integrally bonding a number of honeycomb segments by bonding material layers has been proposed, showing some improvement on the thermal shock resistance. Such a divided-type honeycomb structure has a number of honeycomb segments, each having a configuration which forms a part of the entire structure installed in the direction vertical to the axis so as to form the entire structure by being integrated with other segments by bonding material layers so that the cross section of the resulting structure cut along the plane vertical to the center axis has a specified shape such as a circle. The outer surface of the honeycomb structure is coated with a coating material.

Along with the demand for enlargement of filters in recent years, the thermal stress generated during regeneration of the filter has also increased. In order to prevent the above-mentioned defects, an increase in the thermal shock resistance of the honeycomb structure is strongly desired. In particular, the bonding material layer for integrally bonding the two or more honeycomb segments is desired to possess an excellent stress relaxation effect and excellent bonding strength to improve the thermal shock resistance of the honeycomb structure.

In order to avoid occurrence of such defects, a ceramic structure (honeycomb structure) designed to increase durability by suppressing migration in the course of drying and curing by adding an inorganic fiber and an organic binder to the sealing material (bonding material layer) has been proposed (see Patent Document 1).
(Patent Document 1) Japanese Patent No. 3121497

DISCLOSURE OF THE INVENTION

However, in the uniform structure formed by entanglement of inorganic fibers and organic binders in the sealing material (bonding material layer) used for the ceramic structure (honeycomb structure) described in Patent Document 1, it is difficult to obtain the required bonding strength between the segments and the bonding material layers, and, at the same time, to obtain the stress relaxation effect of the bonding material layers themselves.

The present invention has been accomplished in view of the above problems and has an object of providing a honeycomb structure useful as an exhaust gas filter, particularly a diesel particulate filter (DPF) for collecting particulate matter in the exhaust gas from diesel engines, which is excellent in thermal shock resistance and can inhibit cracks and the like without fail particularly during filter regeneration.

In order to achieve the above object, the present invention provides the following honeycomb structures.

[1] A honeycomb structure comprising a honeycomb segment bonded body in which a number of honeycomb segments are integrated on each bonding planes via bonding material layers, and having a structure in which a number of cells forming fluid flow channels are disposed in parallel in the direction of the center axis thereof the honeycomb structure being constructed so that the porosity of an outer portion of the bonding material layers (an area from the interface with the honeycomb segment-bonding plane to a point apart from that interface by a distance equivalent to 20% of the entire layer thickness) is smaller than the porosity of the central portion located inward of the outer portion, and so that the bonding material layers have a compression Young's modulus along the Z-axis of 5 to 100 MPa.

[2] The honeycomb structure according to [1], wherein the compression Young's modulus of the bonding material layer along the Z-axis is 10 to 80 MPa.

[3] The honeycomb structure according to [1], wherein the compression Young's modulus of the bonding material layer along the Z-axis is 15 to 50 MPa.

[4] The honeycomb structure according to any one of [1] to [3], wherein the porosity of the outer portion of the bonding material layers is 5 to 40% and the porosity of the central portion is 25 to 90%.

[5] The honeycomb structure according to any one of [1] to [3], wherein the porosity of the outer portion of the bonding material layers is 10 to 30% and the porosity of the central portion is 30 to 70%.

[6] The honeycomb structure according to any of [1] to [5], satisfying the relationship of the length (L) and the diameter (D) of L/D<4.0.

[7] The honeycomb structure according to any of [1] to [5], satisfying the relationship of the length (L) and the diameter (D) of L/D<2.5.

[8] The honeycomb structure according to any of [1] to [5], satisfying the relationship of the length (L) and the diameter (D) of L/D<1.5.

[9] The honeycomb structure according to any of [1] to [8], wherein the bonding material layer contains 20 to 45 mass % of an inorganic fiber with a shot content of 10 to 50 mass %, has an average diameter in the direction vertical to the direction of the major axis of 1 to 20 μm, and has an average length in the direction of the major axis of 10 to 400 μm.

[10] The honeycomb structure according to any one of [1] to [9], wherein the thickness of the bonding material layer is 0.5 to 3 mm.

[11] The honeycomb structure according to any one of [1] to [10], wherein the honeycomb segment is made of silicon carbide (SiC) or a silicon-silicon carbide composite material formed using a silicon carbide (SiC) as an aggregate and silicon (Si) as a binder.

According to the present invention, a honeycomb structure excelling in thermal shock resistance and useful as an exhaust gas filter, particularly a diesel particulate filter (DPF) for collecting particulate matter in the exhaust gas from diesel engines without causing a defect such as a crack during filter regeneration can be provided.

EXPLANATION OF SYMBOLS

1: honeycomb structure, 2: honeycomb segment, 4: coating material, 5: cell, 6: partition wall, 7: filler material, 9: bonding material layer, 10: honeycomb segment bonded body

BEST MODE FOR CARRYING OUT THE INVENTION

Preferred embodiments of the present invention are described below in detail. Note that the present invention is not limited to the following embodiments, and various modifications and improvements of the design may be appropriately made without departing from the scope of the present invention based on knowledge of a person having ordinary skill in the art.

Figure 1:
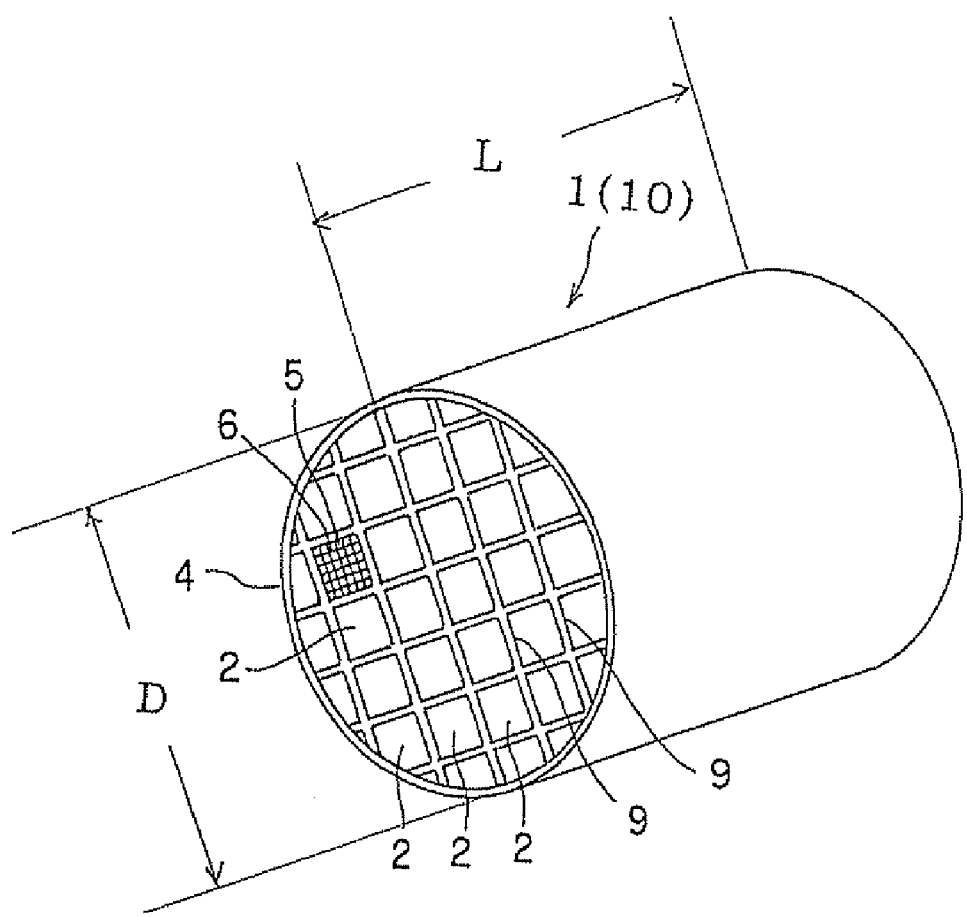
FIG. 1 is an oblique view schematically showing one embodiment of the honeycomb structure (in which the shape of the entire cross-section cut in the direction vertical to the center axis is circular) according to the present invention.
Figure 2:
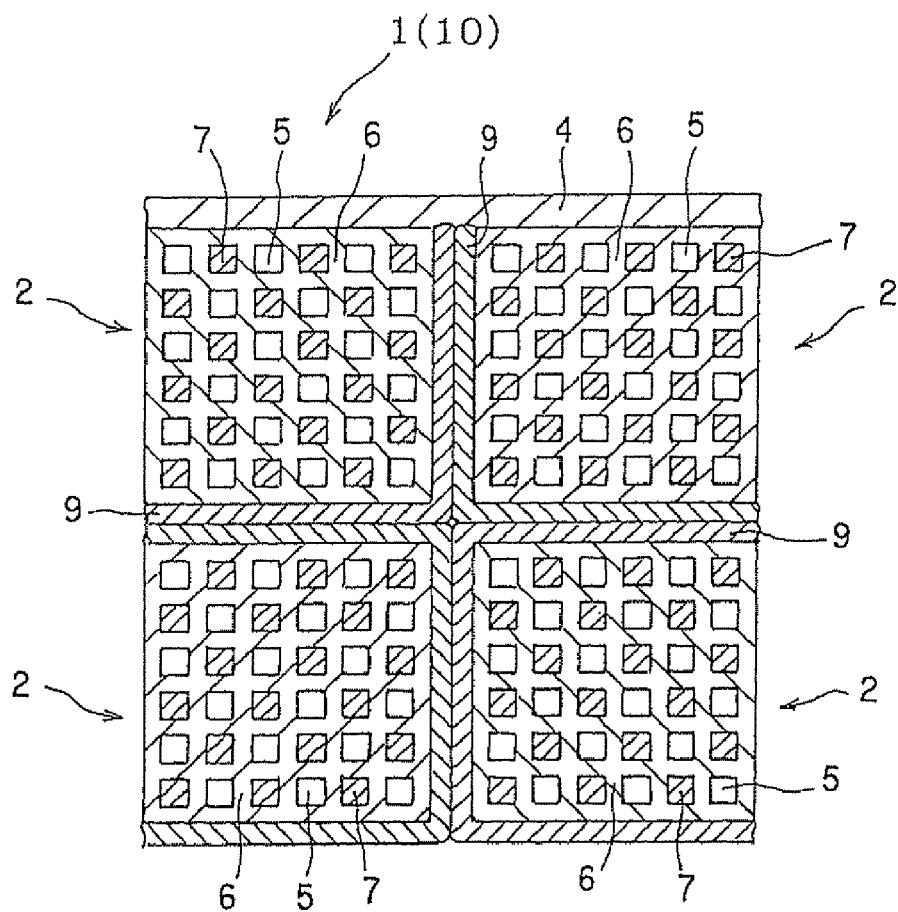
FIG. 2 is a front view schematically showing another embodiment of the honeycomb structure (in which the shape of the entire cross-section cut in the direction vertical to the center axis is square) according to the present invention.

As shown in FIG. 1 and FIG. 2, the honeycomb structure 1 of the embodiment of the present invention comprises a honeycomb segment bonded body 10 in which a number of honeycomb segments 2 are integrated on each bonding planes via bonding material layers 9, and having a structure in which a number of cells 5 forming fluid flow channels are disposed in parallel in the direction of the center axis thereof, the honeycomb structure being constructed so that the porosity of an outer portion of the bonding material layers 9 (an area from the interface with the honeycomb segment-bonding plane to a point apart from that interface by a distance equivalent to 20% of the entire layer thickness) is smaller than the porosity of the central portion located inward of the outer portion, so that the bonding material layers 9 have a compression Young's modulus along the Z-axis of 5 to 100 MPa.

Figure 3:
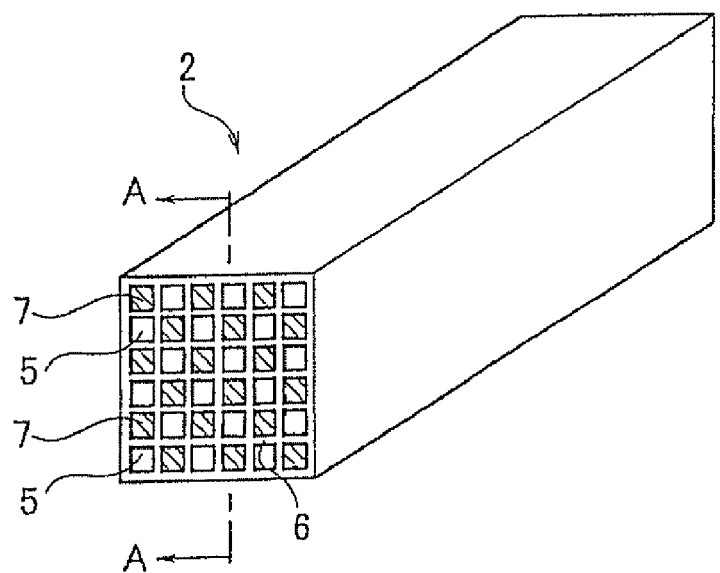
FIG. 3 is an oblique view schematically showing honeycomb segments used in the other embodiment of the honeycomb structure of the present invention.
Figure 4:
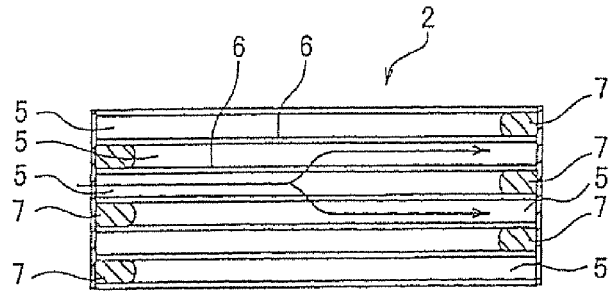
FIG. 4 is a cross-sectional view along the line A-A shown in FIG. 3.

The honeycomb structure 1 of the embodiment of the present invention will now be described in more detail. The honeycomb structure 1 of the embodiment of the present invention has a number of cells 5, each functioning as a fluid flow channel and partitioned from the others by porous partition walls 6. The cells 5 are disposed in parallel in the direction of the center axis of the honeycomb structure 1. The honeycomb structure 1 also comprises a number of honeycomb segments 2, each having a configuration forming the entire structure of the honeycomb structure 1 when combined in the direction vertical to the center axis of the honeycomb structure 1. The honeycomb segments 2 are integrally bonded by bonding material layers 9 to form a honeycomb segment bonded body 10. After bonding the honeycomb segments 2 by the bonding material layers 9, the bonded body is ground to have a cross-sectional shape such as a circle, an oval, a triangle, a square, or the like, when cut along a plane vertical to the center axis of the honeycomb structure 1, and the outer circumferential surface is coated with a coating material 4. When used as a DPF by being installed in an exhaust system of a diesel engine, the honeycomb structure 1 can entrap particulate matter, including soot discharged from a diesel engine. In FIG. 1, the cells 5 and the partition walls 6 are shown only in one honeycomb segment 2. As shown in FIG. 3 and FIG. 4, each honeycomb segment 2 has a configuration which forms a part of the entire honeycomb structure 1 (honeycomb segment bonded body 10) (see FIG. 1), and forms the entire structure when installed in the direction vertical to the center axis of the honeycomb structure 1 (see FIG. 1). The cells 5 are arranged parallel to the center axis of the honeycomb structure 1 and the adjacent cells 5 are alternately plugged on either end using a filler material 7.

As shown in FIG. 3 and FIG. 4, a certain cell 5 (inlet cell) is open on the left end and is plugged on the right end using the filler material 7, and another cell 5 (outlet cell) adjacent thereto is plugged on the left end using the filler material 7 and is open on the right end. As a result of such alternate plugging, the honeycomb segment 2 exhibits a checkered pattern at an end as shown in FIG. 2. When the honeycomb structure 1 formed by bonding a number of such honeycomb segments 2 is installed in an exhaust system, the exhaust gas is fed to the cells 5 of the honeycomb segment 2 from the left end and moves to the right as shown in FIG. 4.

In FIG. 4, in which the left end of the honeycomb segment 2 is used as the inlet port of the exhaust gas, the gas enters the honeycomb segment 2 from the cells 5 (inflow cells) that are open. The exhaust gas which flows into the cells 5 (inlet cells) passes through the porous partition walls 6 and flows out of other cells 5 (outlet cells). When passing through a partition wall 6, the particulate matter including soot in an exhaust gas is entrapped by the partition wall 6. The exhaust gas can be purified in this manner. Since the particulate matter including soot entrapped in this manner accumulates in the honeycomb segment 2 and increases the pressure loss over time, regeneration is carried out in order to burn the soot and the like. Although a honeycomb segment 2 with a square cross-sectional configuration is shown in FIG. 2 to FIG. 4, the cross-sectional configuration may be a triangle a hexagon, or the like. The cross-sectional configuration of the cells 5 may also be a triangle, a hexagon, a circle, an ellipse, or the like.

The honeycomb structure of the present invention, which has the above-mentioned structure, is constructed so that the porosity of an outer portion of the bonding material layers 9

(an area from the interface with the honeycomb segment-bonding plane to a point apart from that interface by a distance equivalent to 20% of the entire layer thickness) is smaller than the porosity of a central portion located inward of the outer portion, and so that the bonding material layers 9 have a compression Young's modulus along the Z-axis of 5 to 100 MPa, preferably 10 to 80 MPa, and more preferably 15 to 50 MPa.

The compression Young's modulus along the Z-axis is calculated as follows. A sample of a predetermined dimension (10×10 mm to 30×30 mm, thickness: 0.5 to 3 mm) is cut out and subjected to the compression test in the Z-axis direction. A substrate may be attached to the sample. Assuming the inclination in the stress-strain curve when applying a load of 0 to 3 MPa as the Young's modulus of elasticity, the compression Young's modulus along the Z-axis is calculated using the following formula.

$$E = \frac{W}{S} \times \frac{t}{\Delta t}$$

E: Young's modulus of elasticity (MPa)
W: Load (N)
S: Sample area (mm$^2$)
t: Sample thickness (mm)
$\Delta t$: Change in the sample thickness (mm)

If the porosity of an outer portion of the bonding material layers (an area from the interface with the honeycomb segment-bonding plane to a point apart from that interface by a distance equivalent to 20% of the entire layer thickness) is equivalent to or larger than the porosity of a central portion located inward of the outer portion, the bonding strength in the interface between the segment and the bonding material layer cannot be obtained in the outer portion, and the Young's modulus of elasticity of the bonding material layer cannot be decreased due to the porosity of the central portion. It is impossible to ensure both a sufficiently high bonding strength in the interface between the segment and the bonding material layer and an adequate stress relaxation function of the bonding material layer at the same time.

If the compression Young's modulus along the Z-axis of the bonding material layer used in the embodiment is less than 5 MPa, the segment is significantly deformed and may produce cracks when there is a temperature distribution in the segment. A compression Young's modulus along the Z-axis of more than 100 MPa, on the other hand, may not cause a problem if the segment is alone, but in a honeycomb structure in which a number of honeycomb segments are integrated by bonding material layers, a stress cannot be reduced and may cause a rapid thermal stress during regeneration in the DPF, which may result in damage on the periphery.

The porosity of the outer portion of the bonding material layer used in the embodiment is preferably 5 to 40%, and the porosity of the center area is preferably 25 to 90%. More preferably, the porosity of the outer portion of the bonding material layer 9 is 10 to 30%, and the porosity of the center area is 30 to 70%. If the porosity of the outer portion of the bonding material layer is less than 5%, the Young's modulus of elasticity may be too large to sufficiently exhibit a stress relaxation effect; if more than 40%, the bonding strength of the segment and the bonding material layer may decrease. If the porosity of the center area is less than 25%, the Young's modulus of elasticity may increase; if more than 90%, the strength decreases and cracks may be produced. The average porosity of the bonding material layer is 17 to 70%, and more preferably 22 to 54%.

The honeycomb structure used in the embodiment preferably satisfies the relationship of the length (L) and the diameter (D) of L/D<4.0, more preferably L/D<2.5, and particularly preferably L/D<1.5. If the ratio (L/D) of the length (L) and the diameter (D) is more than 4.0, the temperature difference between the center and the end during regeneration of the DPF increases and may cause cracks due to a rapid thermal stress increase. When the cross-section of the honeycomb structure is circular, the diameter (D) is the circle diameter; when the cross-section of the honeycomb structure is oval, the diameter (D) is the mean value of the minor axis and the major axis; and when the cross-section of the honeycomb structure has other configurations, the diameter (D) is defined as the diameter of a circumscribed circle.

Beside the inorganic fiber, the bonding material layer used in the embodiment preferably contains an inorganic binder, an organic binder, an inorganic particle, a foaming particle, and the like. As examples of the inorganic fiber, oxide fibers such as aluminosilicate, alumina, $SiO_2$—MgO, $SiO_2$—CaO—MgO, other fibers (for example, SiC fiber), and the like can be given. As examples of the inorganic binder, silica sol, alumina sol, clay, and the like can be given. As examples of the organic binder, polyvinyl alcohol (PVA), carboxymethylcellulose (CMC), methylcellulose (MC), and the like can be given. As examples of the inorganic particles, ceramics such as silicon carbide, silicon nitride, cordierite, alumina, mullite, and the like can be given. The same material as the coating material mentioned later can be used for the bonding material which constitutes the bonding material layer.

The content of the inorganic fiber is preferably 20 to 45 mass % (more preferably 30 to 40 mass %), the shot content is preferably 10 to 50 mass %, the average diameter of the cross-section vertical to the direction of the major axis is preferably 1 to 20 μm (more preferably 2 to 15 μm), and the average length in the direction of the major axis is preferably 10 to 600 μm (more preferably 50 to 300 μm).

If the content of the inorganic fiber is less than 20 mass %, the bonding material layer may not be provided with elasticity. If more than 45 mass %, a large amount of water is required in order to obtain a paste which can be applied. Use of a large amount of water significantly increases shrinkage at the time of drying the bonding material and may cause a crack. If the shot content is less than 10 mass %, a large amount of water is required in order to obtain a paste which can be applied. The use of a large amount of water significantly increases shrinkage at the time of drying the bonding material and may cause a crack. If more than 50 mass %, the bonding material layer may not be provided with elasticity. If the average diameter of the cross-section vertical to the direction of the major axis is less than 1 μm, the bonding material layer may not be provided with elasticity. The average diameter exceeding 20 μm may significantly affect the thickness of the bonding material layer, making it difficult to uniformly apply the bonding material on the outer surface of the honeycomb segment. If the average length in the direction of the major axis is less than 10 μm, the bonding material layer may not be provided with elasticity; if more than 600 μm, applicability may decrease.

As shown in FIG. 2, the bonding material layer 9 is applied to the outer circumference of the honeycomb segment 2 and functions to bond the honeycomb segment 2. Although the bonding material layer 9 may be applied to the outer circumference of each of the adjoining honeycomb segments 2, it is possible to apply the bonding material layer to the outer circumference of only one of the two adjoining honeycomb segments 2. Application of the bonding material layer to only one of the adjoining honeycomb segments is preferable from the viewpoint of reducing the number of the bonding material layers 9 used. The thickness of the bonding material layer 9 is determined by taking the bonding strength between the honeycomb segments 2 into account, and appropriately selected from a range of 0.5 to 3.0 mm, for example.

As the material of the honeycomb segment 2 used in the embodiment, from the viewpoint of strength and heat resistance, at least one material selected from the group consisting of silicon carbide (SiC), a silicon-silicon carbide composite material formed from silicon carbide (SiC) as an aggregate and silicon (Si) as a binder, silicon nitride, cordierite, mullite, alumina, spinel, a silicon carbide-cordierite composite material, a silicon-silicon carbide composite material, lithium aluminum silicate, aluminum titanate, and an Fe—Cr—Al metal can be given. Of these materials, silicon carbide (SiC) or a silicon-silicon carbide composite material is preferable.

The honeycomb segment 2 is produced as follows, for example. A binder such as methylcellulose, hydroxypropoxylcellulose, hydroxyethylcellulose, carboxymethylcellulose, or polyvinyl alcohol, a surfactant, water as a solvent, and the like are added to a material selected from the above-mentioned materials to prepare plastic clay. The plastic clay is extruded to obtain a product having the above-described configuration. The resulting formed product is dried by microwave, a hot blast, or the like, and sintered.

The same material as that used for the honeycomb segment 2 can be used as the filler material 7 for plugging the cells 5. Plugging with the filler material 7 may be carried out by masking the cells 5 which do not need plugging and dipping the end of the honeycomb segment 2 into the filler material 7 in slurry form to fill in the open cells 5. Plugging with the filler material 7 may be carried out either before or after sintering of the formed honeycomb segment 2. Plugging before sintering is preferred to complete the sintering in one step.

After forming the honeycomb segment 2 in this manner, the bonding material layer 9 in slurry form is applied to the outer circumference of the honeycomb segment 2 and a number of such honeycomb segments 2 are bonded together to form a prescribed three-dimensional configuration (entire honeycomb structure 1). After pressing, the attached body is heated and dried. A number of honeycomb segments 2 are integrally bonded in this manner to obtain the bonded body. The bonded body is ground into the prescribed configuration and the outer circumference is covered with a coating material 4, which is then dried by heating. The honeycomb structure 1 shown in FIG. 1 is obtained in this manner. The same material used for forming the bonding material layer 9 may be used as the coating material 4. The thickness of the coating material 4 is selected from a range of 0.1 to 1.5 mm, for example.

As described above, a honeycomb structure useful as an exhaust gas filter, particularly a diesel particulate filter (DPF) for collecting particulate matter in the exhaust gas from diesel engines, excelling in thermal shock resistance, and which can inhibit cracks and the like without fail particularly during filter regeneration can be obtained according to the present invention.

EXAMPLES

The present invention is described below in more detail by examples. However, the present invention is not limited by the following examples.

Example 1

Preparation of Honeycomb Segment

As honeycomb segment raw materials, SiC powder and Si metal powder were mixed at a mass ratio of 80:20, and starch and a foaming resin, as a pore-forming agent were added, followed by the addition of methylcellulose, hydroxypropoxylmethylcellulose, a surfactant, and water, to obtain plastic clay. The clay was extruded and dried with a microwave and a hot blast to obtain a honeycomb segment with a partition wall thickness of 310 μm, a cell density of about 46.5 cells/cm$^2$ (300 cells/in$^2$), a cross-section configuration of a 35×35 mm square, and a length of 152 mm. The ends of the cells of the resulting formed body of the honeycomb segment were plugged so that the ends exhibit a checkered pattern. That is, the adjoining cells were alternately plugged at the end on opposing sides. The same material as the material of the honeycomb segment was used as the plugging material. The product obtained by plugging the ends of the cells and drying was defatted at about 400° C. in the atmosphere and sintered at about 1450° C. in an Ar inert atmosphere to obtain a honeycomb segment with a porous structure in which SiC crystal particles were bonded by Si.

(Preparation Bonding Material)

Aluminosilicate fiber having a shot content of 50% was used as the inorganic fiber. A mixture of 22 mass % of colloidal silica and 1 mass % of clay as inorganic binders and SiC as inorganic particles, and optionally water were added. As required, an organic binder (CMC, PVA), a foaming resin, and a dispersant were added. The resulting mixture was kneaded for 30 minutes using a mixer to obtain a bonding material in the form of a paste. Bonding materials in the form of a paste (bonding materials No. 1 to 12) were prepared from different types of materials with different compositions as shown in Table 1.

(Preparation of Honeycomb Structure)

Figure 5:
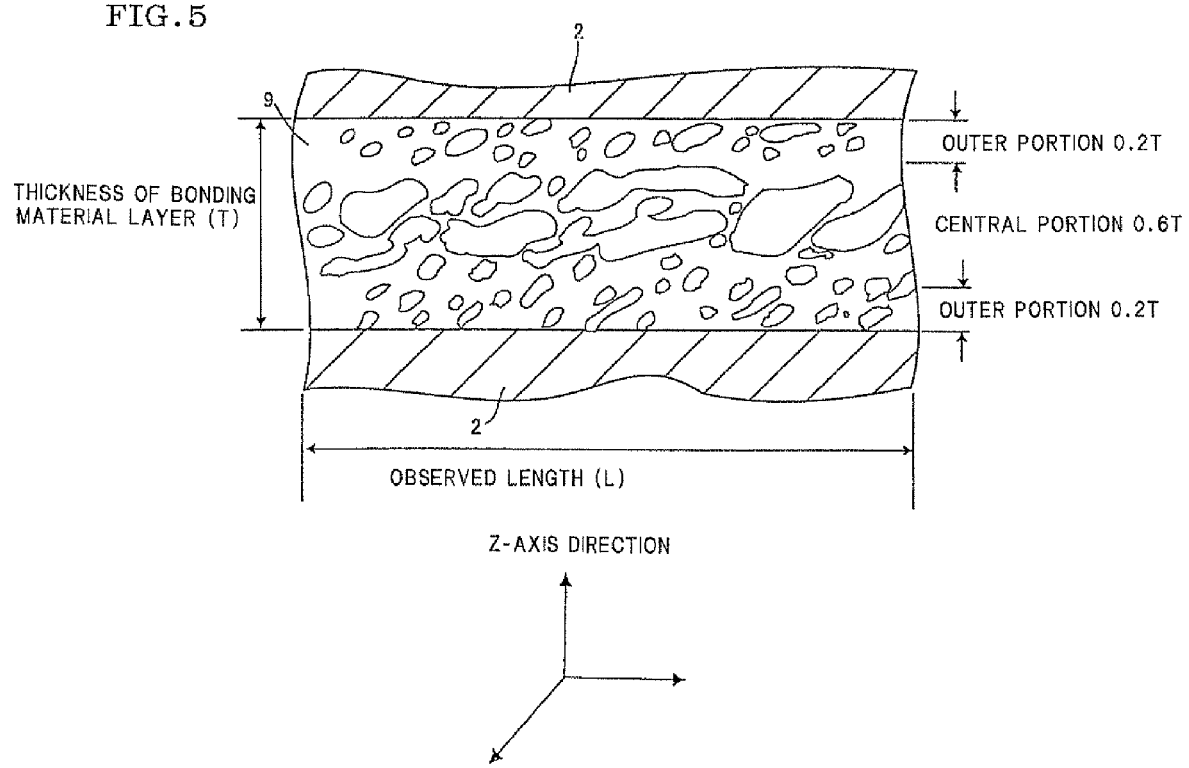
FIG. 5 is a view schematically showing the results of SEM observation of the pore distribution of a cross-section of a sample for measuring porosity prepared in Examples.

The bonding material No. 1 was applied onto the surface of the outer wall of the honeycomb segment to produce a coating with a thickness of about 1 mm. A step of mounting the other honeycomb segments on that honeycomb segment was repeated to obtain a honeycomb segment laminate consisting of 16 honeycomb segments. Pressure was applied from the outside to bond the entire laminate which was dried at 140° C. for two hours to obtain a honeycomb segment bonded body. After cutting the periphery to produce a cylinder-shaped honeycomb segment bonded body, the coating material was applied and heated at 700° C. for two hours for drying and curing, thereby obtaining a honeycomb structure. The obtained honeycomb structure was cut to produce a sample for measuring porosity. After embedding with a resin and grinding, the pore distribution in a cross-section of the porosity-measuring sample was observed by SEM at a magnification of about 10 to 40 times. The porosity was determined by image analysis of the resulting photograph using "Image Pro (Ver5.0)" (manufactured by Media Cybernetics Co.). The results of observation of the pore distribution are shown in FIG. 5. An area with at least a length of 3 mm of the sample was used for calculating the porosity. The results are shown in Table 2. The porosity around the center of the bonding material was 68%, and the porosity of the outer portion was 37%.

The results of the compression Young's modulus of the bonding material in the Z-axis direction are shown in Table 2. The compression Young's modulus of the bonding material in the Z-axis direction of Example 1 was 95 MPa.

A rapid heating test (burner spalling test B-sp), a rapid cooling test (electric furnace spalling test E-sp), and an engine test (E/G test) of the honeycomb structure were carried out. The results are shown in Table 2.

Examples 2 to 9 and Comparative Examples 1 to 3

In Examples 2 to 9, the experiment of Example 1 was followed, except for using the bonding materials No. 2 to 9 instead of the bonding material No. 1. In Comparative Examples 1 to 3, the experiment of Example 1 was followed, except for using the bonding materials No. 10 to 12 instead of the bonding material No. 1. The test results of the bonding materials of the honeycomb structures prepared in Examples and Comparative Examples are shown in Table 2.

an ambient temperature atmosphere to evaluate the thermal shock resistance by observing the presence or absence of cracks.

E/G test: 1000° C. engine test: The accumulated particulate matter is burned to regenerate the filter, and the thermal shock resistance is evaluated by observing the presence or absence of cracks when the center of the honeycomb structure is heated to 1000° C.

In Table 2, the results are indicated as "Good" if no cracks were found, and as "Bad" if there was a crack. As can be seen from the results shown in Table 2, the honeycomb structures made from the bonding material No. 10 (Comparative Example 1) in which the compression Young's modulus of elasticity of the Z-axis of the bonding material layer is 150 MPa or the bonding material No. 11 (Comparative Example

TABLE 1

| Bonding material No. | Inorganic fiber Average length (μm) | Inorganic fiber Average diameter (μm) | Inorganic fiber (mass %) | Organic binder (mass %) | Inorganic particle (mass %) | Other (mass %) |
|---|---|---|---|---|---|---|
| 1 | 50 | 8 | 34.5 | | 41.7 | Dispersant: 0.3 Foaming resin: 1.0 |
| 2 | 100 | 10 | 34.5 | | 41.5 | Dispersant: 0.5 Foaming resin: 1.0 |
| 3 | 200 | 8 | 34.5 | | 41.3 | Dispersant: 0.7 Foaming resin: 1.0 |
| 4 | 50 | 8 | 34.5 | CMC 0.3 | 42.2 | Foaming resin: 1.0 |
| 5 | 100 | 5 | 34.5 | CMC 0.4 | 42.1 | Foaming resin: 1.0 |
| 6 | 200 | 5 | 34.5 | CMC 0.5 | 42 | Foaming resin: 1.0 |
| 7 | 300 | 5 | 34.5 | CMC 0.8 | 41.7 | Foaming resin: 1.0 |
| 8 | 200 | 5 | 34.5 | PVA 1.0 | 41 | Foaming resin: 1.0 |
| 9 | 300 | 5 | 34.5 | PVA 1.2 | 40.8 | Foaming resin: 1.0 |
| 10 | 30 | 4 | 19.0 | | 57.2 | Dispersant: 0.3 Foaming resin: 1.0 |
| 11 | 50 | 5 | 50.0 | | 26.2 | Dispersant: 0.3 Foaming resin: 1.0 |
| 12 | 450 | 5 | 40.0 | CMC 0.8 | 36.5 | Dispersant: 0.3 Foaming resin: 1.0 |

TABLE 2

| | | Bonding material No. | Porosity of outer portion of bonding material layer | Porosity of central portion of bonding material layer | Compression Young's modulus along Z-axis MPa | B-sp test | E-sp test | E/G test |
|---|---|---|---|---|---|---|---|---|
| Example | 1 | 1 | 37 | 68 | 95 | 800° C. | Good | Good |
| | 2 | 2 | 38 | 71 | 70 | 900° C. | Good | Good |
| | 3 | 3 | 40 | 74 | 45 | 950° C. | Good | Good |
| | 4 | 4 | 19 | 54 | 75 | 850° C. | Good | Good |
| | 5 | 5 | 23 | 62 | 50 | 950° C. | Good | Good |
| | 6 | 6 | 25 | 65 | 40 | 1000° C. | Good | Good |
| | 7 | 7 | 30 | 70 | 15 | 1100° C. | Good | Good |
| | 8 | 8 | 32 | 65 | 38 | 1000° C. | Good | Good |
| | 9 | 9 | 37 | 72 | 10 | 1100° C. | Good | Good |
| Comparative Example | 1 | 10 | 45 | 50 | 150 | 750° C. | Good | Bad |
| | 2 | 11 | 52 | 50 | 105 | 700° C. | Bad | Bad |
| | 3 | 12 | 53 | 51 | 4 | 800° C. | Bad | Bad |

B-sp test: burner spalling test (rapid heating test): The air heated with a burner is caused to flow through the honeycomb structure to create a temperature difference between the center area and the outer area. The thermal shock resistance of the honeycomb structure is evaluated by the temperature at which a crack is not produced. The higher the temperature, the higher the thermal shock resistance.
E-sp test: electric furnace spalling test (rapid cooling test): The honeycomb structure is heated in an electric furnace at 500° C. for two hours. After being uniformly heated, the honeycomb structure is removed from the electric furnace to 2) in which the compression Young's modulus of elasticity of the Z-axis of the bonding material layer is 105 MPa and the porosity in the center of the bonding material layer is smaller than the porosity in the outer area produced cracks after the tests. The honeycomb structures made from the bonding material No. 12 (Comparative Example 3) in which the compression Young's modulus of elasticity of the Z-axis of the bonding material layer is 4 MPa and the porosity in the center of the bonding material layer is smaller than the porosity in the outer area also produced cracks after the tests. This is thought to be the result of inability of the bonding material layers to exhibit sufficient elasticity and to reduce the thermal stress generated during the tests. The honeycomb structures made from the bonding materials No. 1 to 9 (Examples 1 to 9) in which the compression Young's modulus of elasticity of the Z-axis of the bonding material layer is from 5 to 100 MPa and the porosity in the center of the bonding material layer is larger than the porosity in the outer area produced no cracks after the tests.

INDUSTRIAL APPLICABILITY

The honeycomb structure of the present invention is useful as a filter for exhaust gas such as a diesel particulate filter (DPF) for removing particulates (particulate matter) contained in exhaust gas discharged from a diesel engine and the like.

The invention claimed is:

1. A honeycomb structure comprising a honeycomb segment bonded body in which a number of honeycomb segments are integrated on each bonding plane via bonding material layers, and having a structure in which a number of cells forming fluid flow channels are disposed in parallel in the direction of the center axis thereof,
the honeycomb structure being constructed so that the porosity of an outer portion of the bonding material layers (an area from the interface with the honeycomb segment bonding plane to a point apart from that interface by a distance equivalent to 20% of the entire layer thickness) is smaller than the porosity of the central portion located inward of the outer portion, and so that the bonding material layers have a compression Young's modulus along the Z-axis of 5 to 100 MPa, and
the bonding material comprises inorganic fibers having an average length in the direction of the inorganic fibers' major axis of 200 to 600 μm.

2. The honeycomb structure according to claim 1, wherein the compression Young's modulus of the bonding material layer along the Z-axis is 10 to 80 MPa.

3. The honeycomb structure according to claim 1, wherein the compression Young's modulus of the bonding material layer along the Z-axis is 15 to 50 MPa.

4. The honeycomb structure according to claim 1, wherein the porosity of the outer portion of the bonding material layers is 5 to 40% and the porosity of the central portion is 25 to 90%.

5. The honeycomb structure according to claim 1, wherein the porosity of the outer portion of the bonding material layers is 10 to 30% and the porosity of the central portion is 30 to 70%.

6. The honeycomb structure according to claim 1, wherein a length (L) and the diameter (D) of the honeycomb structure satisfies a relationship of L/D<4.0.

7. The honeycomb structure according to claim 1, wherein a length (L) and the diameter (D) of the honeycomb structure satisfies a relationship of L/D<2.5.

8. The honeycomb structure according to claim 1, wherein a length (L) and the diameter (D) of the honeycomb structure satisfies a relationship of L/D<1.5.

9. The honeycomb structure according to claim 1, wherein the bonding material layer contains 20 to 45 mass % of the inorganic fibers with a shot content of 10 to 50 mass %, and the inorganic fibers have an average diameter in the direction vertical to the direction of the inorganic fibers' major axis of 1 to 20 μm.

10. The honeycomb structure according to claim 1, wherein the thickness of the bonding material layer is 0.5 to 3 mm.

11. The honeycomb structure according to claim 1, wherein the honeycomb segment is made of silicon carbide (SiC) or a silicon-silicon carbide composite material formed using a silicon carbide (SiC) as an aggregate and silicon (Si) as a binder.

12. The honeycomb structure according to claim 9, wherein the porosity of the outer portion of the bonding material layers is 5 to 40% and the porosity of the central portion is 25 to 90%.

13. The honeycomb structure according to claim 12, wherein the porosity of the outer portion of the bonding material layers is 10 to 30% and the porosity of the central portion is 30 to 70%.

14. The honeycomb structure according to claim 9, wherein the thickness of the bonding material layer is 0.5 to 3 mm.

15. The honeycomb structure according to claim 9, wherein the honeycomb segment is made of silicon carbide (SiC) or a silicon-silicon carbide composite material formed using a silicon carbide (SiC) as an aggregate and silicon (Si) as a binder.

* * * * *